March 6, 1962   J. H. MORROW   3,024,071
FLUIDIZING CONVEYING APPARATUS
Filed Dec. 24, 1958   2 Sheets-Sheet 1
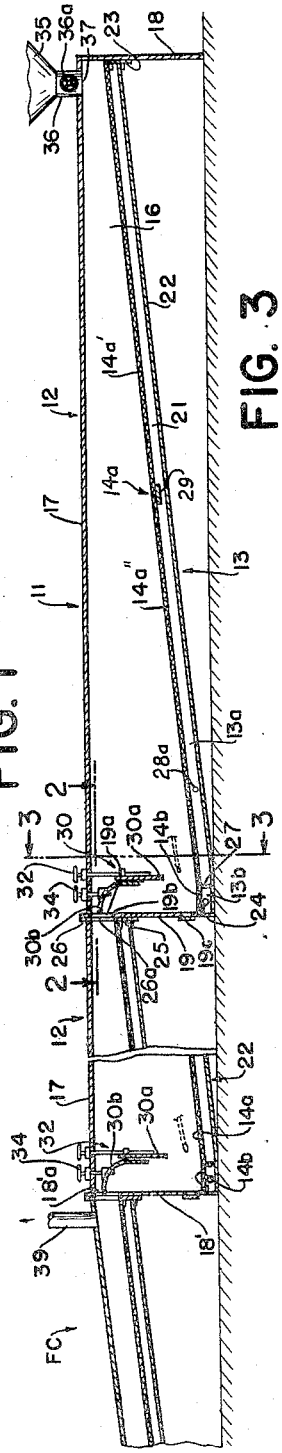
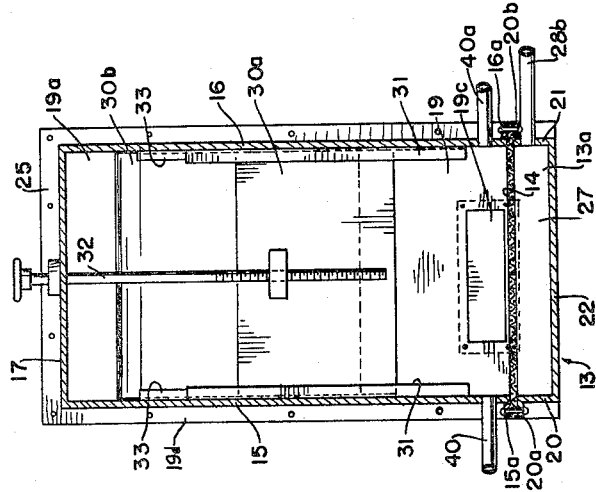
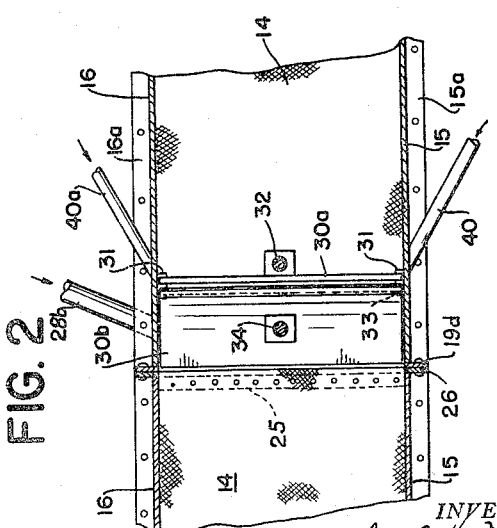
INVENTOR.
Joseph H. Morrow
BY
Benson & Taylor ATTORNEYS

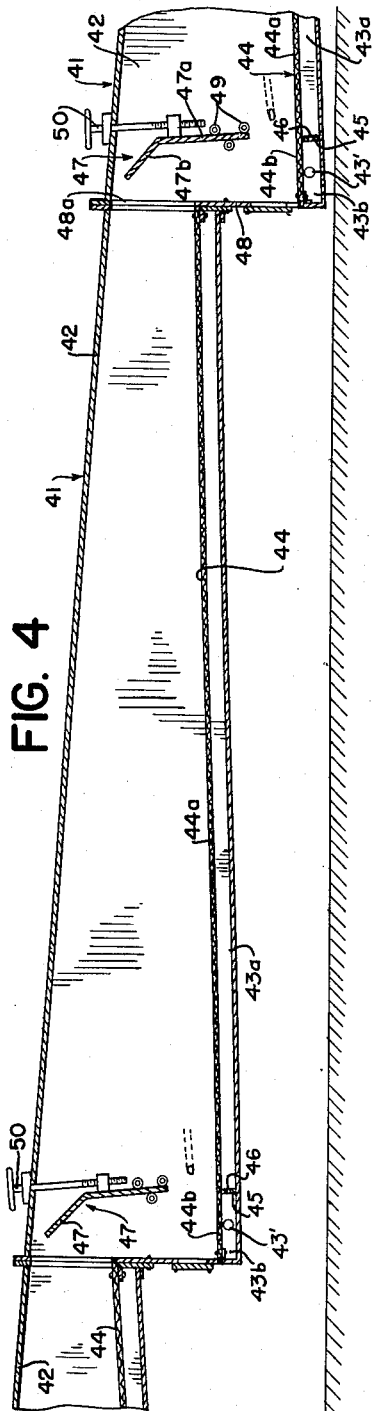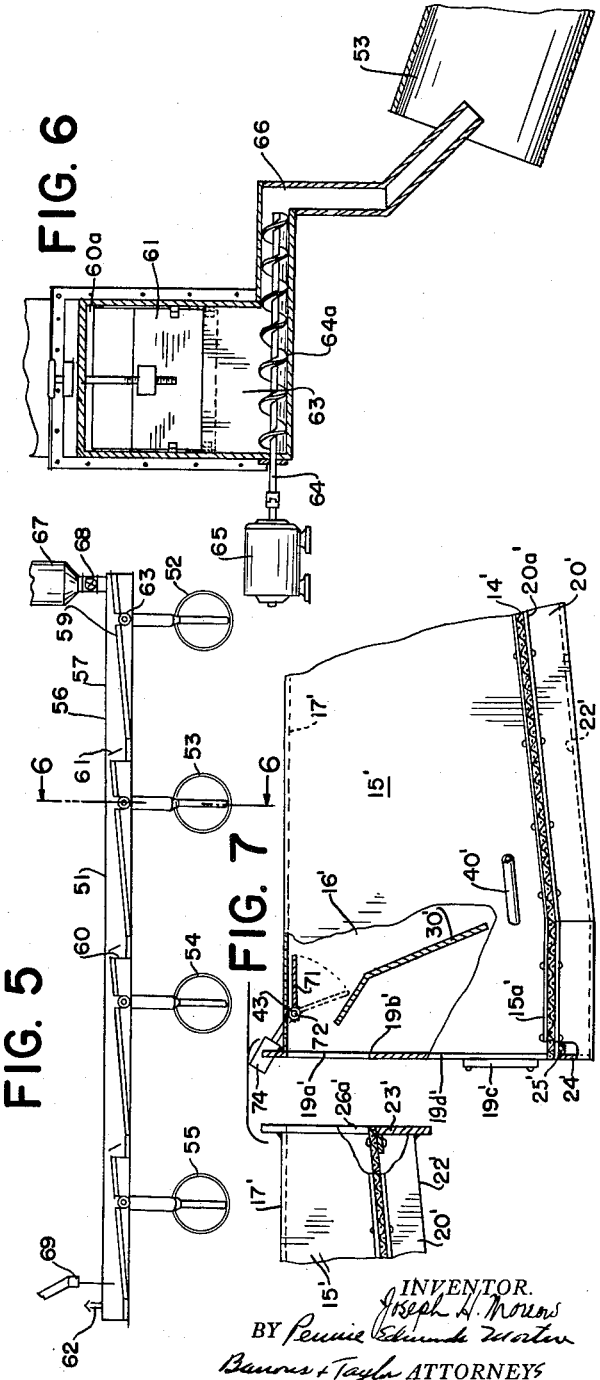

United States Patent Office 3,024,071
Patented Mar. 6, 1962

3,024,071
FLUIDIZING CONVEYING APPARATUS
Joseph H. Morrow, Hokendauqua, Pa., assignor to Fuller Company, Catasauqua, Pa., a corporation of Delaware
Filed Dec. 24, 1958, Ser. No. 782,717
19 Claims. (Cl. 302—29)

The present invention relates to the conveying of pulverulent and granular materials and is concerned more particularly with a novel conveyor for such materials which, although of the fluidizing type, may be applied to services requiring either a substantially horizontal direction of conveying path or a generally inclined conveying path for which prior fluidizing conveyors are unsuitable or unavailable. This application is a continuation-in-part of my prior application Serial No. 694,754, filed November 6, 1957, now abandoned.

Fluidizing conveyors typified by those described in the United States patents to Ihlefeldt, No. 1,971,853, and to Schemm, No. 2,527,455, are principally dependent upon the force of gravity for conveyance of the material. Therefore, such conveyors are limited to services in which the gas-permeable floors thereof are permitted to slope continuously downwardly toward the point of discharge. The angles at which the gas-permeable floors are required to slope are determined by the characteristic angle of repose of the aerated or fluidized material to be conveyed.

In some cases, the available difference in elevation or headroom between the source of the material to be conveyed and the point at which the material is to be discharged from the conveyor is not sufficient to permit convenient installation of a fluidizing conveyor with the requisite degree or angle of slope. When such conditions are encountered, it has been necessary to dig a pit to receive the lower end of the conveyor, to raise the elevation of the material source, which frequently is not feasible, or to provide mechanical conveyors or a combination of mechanical and fluidizing conveyors. However, none of the expedients resorted to heretofore has been entirely satisfactory.

The present invention is, accordingly directed to the provision of a novel fluidizing conveyor which requires a minimum of headroom for its installation and is completely flexible in its overall direction of conveying, thereby being applicable for requirements of horizontally and upwardly directed conveying where prior fluidizing conveyors cannot be used.

Furthermore, the present invention provides an adaptability for various processes and intermediate treatments of the material as it is en route through the conveyor, and permits positive adjustment of the rate at which the material flows through the conveyor without imposing problems such as the venting of air through a choked, or limited-discharge, unlimited-feed system as generally found in prior fluidizing conveyors. A succession of alternate zones of relatively dense material and of relatively dispersed material are provided. Thus a plurality of fluidized beds are present which may be employed, advantageously, as heat transfer zones, gas/solid reaction or contact zones, reservoirs for metered delivery of material, or for any purpose for which such fluidized material beds may be found suitable.

In general, and as embodied in a conveyor having a horizontally-directed conveying path, the preferred form of apparatus of the invention comprises a substantially horizontal casing having a material inlet and a material outlet at opposite ends thereof. An interior gas-permeable floor is arranged in several longitudinal courses in the lower region of the casing, with generally upright, transverse interior walls extending from the downstream end of one floor source to the upstream end of the succeeding course.

Each course of the gas-permeable floor is arranged at a slope which is adequate for effective conveying of the material to be handled. The slope will range from substantially horizontal, for readily flowable material, to as high as 10° or 15° slope from the horizontal for materials exhibiting high angles of repose, when aerated.

The upstream end of each floor course meets the upper end of its adjacent upright interior wall, and the downstream end of each floor course meets the next upright interior wall adjacent its lower end. Adjacent the downstream end of each floor course, a transverse partition is provided in spaced relation with the associated upright interior wall and with the surface of the floor course.

A plenum chamber is arranged beneath each course of the gas-permeable floor, and means are provided for delivering compressed gas through the floor courses in a manner to effect a highest rate of gas flow, per unit area of the floor, through the minor portion of the floor course underlying the space or passageway between the associated upright interior wall and partition, and an intermediate rate of flow through the adjacent upstream area which is, in turn, greater than the simultaneous or concurrent rate of flow through the remainder of the major floor area adjacent the upstream end of the floor course.

As compressed air or gas is thus delivered through the gas-permeable floor, the gas traversing those portions of each course which deliver the lesser rates of gas flow causes a pulverulent material supplied thereto to become fluidized. The fluent characteristics of the fluidized material cause it to flow along the floor courses to the downstream areas thereof in an effort to seek a hydrostatic balance. In this flow, the upper surface of the moving material may either conform to the slope of the floor course or may seek its own angle of flow, depending upon the rate of supply and the rate of discharge therefrom, as well as the flow characteristics of the material. In each case, a fluent pool or bed of material is formed between the upstream region of each floor course and the partition near the downstream area of that course.

As material flows along each of the floor courses toward their downstream areas and beneath the partition walls, the progressively higher rate of gas flow in the downstream region of each course causes the material mass to expand progressively as it moves along the floor course. The confinement of the most highly aerated and expanded material in the regions beneath the passageways between the interior walls and partitions causes it to rise therethrough and to be deflected or diverted to overflow onto the upstream end of the succeeding floor course or, in the case of the partition adjacent the casing outlet, to be discharged from the conveyor.

When the casing employed is of the closed type, the gas employed for fluidization and expansion of the material is vented by passage along an upper wall of the casing, preferably in concurrent flow with the material, thereby sweeping over the partitions and upright interior walls to assist in the diversion of the highly expanded material toward the downstream end of the conveyor.

For a better understanding of the invention, reference may be made to the accompanying drawings, in which:

FIG. 1 is a view in longitudinal section of one form of conveyor embodying the invention;

FIGS. 2 and 3 are sectional views on the lines 2—2 and 3—3 of FIG. 1, respectively;

FIG. 4 is a longitudinal sectional view of a modified form of the new conveyor, which both conveys and elevates the material;

FIG. 5 is a diagrammatic longitudinal sectional view of another modified form of the conveyor employed for supplying material to a plurality of kilns;

FIG. 6 is a sectional view on the line 6—6 of FIG. 5; and

FIG. 7 is a fragmentary side view of a further modified form of conveyor which is adapted for more efficient cleanout of the material.

The form of the new conveyor illustrated in FIGS. 1–3 inclusive comprises a casing 11 having an upper conveying section 12, which serves as a conduit for the material, a lower section 13 in the form of a plenum chamber, and a plurality of gas-permeable floor courses 14, which form the floor of the conduit and the top of the plenum chamber and may be made of any suitable material, such as the fabric described in the aforesaid Schemm patent. However, any suitable gas-permeable medium may be employed. The upper section 12 has parallel, generally horizontally-extending side walls 15, 16, which increase in depth in the direction of flow of the material, a top wall 17, an end wall 18 at the narrow or upstream end of the side walls, and a downstream end wall 18′ having a discharge outlet 18′a therein. The upper section 12 further has a plurality of upright interior walls 19 at the downstream end of each floor course. Each upright interior wall 19 has a downstream opening 19a and an overflow edge 19b near its upper end for passage of material therethrough and a cleanout opening near its lower end, which is normally closed by a door 19c. The plenum chambers have side walls 20, 21 of substantially uniform width from end to end, a bottom wall 22, and end walls 23, 24. The lower edges of the side walls 15, 16 of section 12 are provided with lateral flanges 15a, 16a, respectively, and the upper edges of the side walls of the plenum chamber are formed with corresponding flanges 20a, 20b, respectively. The wall 19 projects outwardly beyond the side walls 15, 16 and upwardly beyond the top wall 17 to form a flange 19d about the downstream opening 19a.

In assembling the conveyor, the fabric of each course is placed in position with its edges between the flanges of the conduit section 12 and plenum chamber 13 and the conduit, the chamber, and the fabric are then secured together by bolts passing through the flanges and the marginal portions of the fabric. Adjacent each of the end walls 23, 24 of the plenum chamber, the end of the fabric is secured in place as shown in said Schemm patent by being bolted to cross-bars 25 extending between and attached to the side walls of the chamber.

Adjacent the upstream end of each floor course 14, except the first, the upper section 12 is provided with flanges 26 which conform to and meet the flanges 19d and which define, with the upstream end of the next lower floor course 14, an upstream opening 26a in direct communication with the downstream opening 19a and the overflow edge 19b.

The plenum chambers 13 are each divided into a major subchamber 13a and a minor subchamber 13b by a transverse wall 27, which extends across the chamber close to the lower end wall 24 thereof. Each floor course 14 is secured to the top of the wall 27 in any suitable way and the wall divides the floor course into a major area 14a at the upstream side of the wall and a minor area 14b at the downstream side of the wall. Air under pressure is supplied to the subchambers 13a and 13b through a pair of individual supply pipes 28a and 28b, respectively. In the region of the longitudinal center of the major area 14a of the floor, a widened cross-bar 29 extends between and is attached to the side walls of the plenum chamber. The major floor area 14a is divided, at the cross-bar 29, into an upstream major area 14a′ and a downstream major area 14a″, the adjacent ends thereof being secured to the cross-bar 29. Both the upstream and downstream areas of the major floor area 14a are secured at their adjacent ends to the cross-bar 29.

Alternatively, a transverse wall similar to the wall 27 may be provided, instead of the cross-bar 29 and suitable, common air supply connections made to each plenum chamber section formed thereby. Also, a cross-bar similar to the cross-bar 29 may be provided in the place of the wall 27, if desired, and when an equal pressure is to be supplied beneath both the major floor area 14a and the minor floor area 14b. The choice between walls and cross-bars is otherwise governed by convenience in fabrication and assembly.

The upstream major area 14a′ is formed of a relatively low permeability fabric, preferably of the type described in the Schemm patent, while the downstream major area 14a″ comprises a fabric whose permeability is between one and one-half to four times that of the fabric of the upstream major area 14a′. The minor floor area 14b preferably comprises a gas-permeable medium having a permeability of from five to fifteen times that of the gas-permeable medium of the upstream major area 14a′, and may be formed of any suitable material such as gas-permeable fabric, stone or metal.

The term "permeability" as used herein conforms to the common usage thereof and is defined as: The amount of air measured in cubic feet and at 70° F. and 25% relative humidity which will pass through the area of one square foot of dry gas-permeable medium in one minute when tested under an equivalent pressure differential of two inches of water.

With the use of gas-permeable media of different permeabilities, in the respective areas of each floor course, air under pressure from a single source, not shown, may be used to supply the various requirements of the conveyor. In many cases, it will be preferable to reduce the pressure of the air supplied to the major floor area 14a to less than the pressure of the air supplied to the minor area, using pressure-reducing means or a second source of air at a lower pressure. In either case, air supplied to the plenum chamber passes through the gas-permeable floor areas at rates per unit area which cause fluidization of the material overlying the upstream major areas 14a′, and a substantially higher degree of fluidization of the material overlying the downstream major areas 14a″, respectively, while the material over the highest permeability, minor areas 14b is most highly aerated, and consequently is most expanded in volume.

In the region above the wall 27, a partition wall 30 is arranged in the upper section 12 and comprises a substantially vertical section 30a movably mounted near and slightly upstream of the plane of wall 27 and over the major floor area 14a in guides 31 attached to the inner surfaces of the side walls 15, 16. The positioning of the partition section 30a slightly upstream from the minor floor area 14b serves to confine the air passing through the minor area into the passage above it. The wall section 30a is vertically adjustable by a suitable device, such as the manually-operated screw 32. The wall 30 also includes a curved deflecting section 30b which has a substantially vertical part movably mounted in guides 33 secured to the walls 15, 16 and lying parallel and close to the guides 31 to provide a sealing relationship between the sections 30a and 30b. The upper part of section 30b is curved toward the aligned openings 19a and 26a, thereby gradually decreasing the cross sectional area of the passage defined by the partition 30, the side walls 15, 16, and the wall 19. The curved deflecting section 30b is vertically movable by adjusting means, such as the screw 34. The upper edge of the deflector section terminates above the level of the overflow edge 19b, and is normally spaced from the under surface of top wall 17 a short distance.

The conveyor is arranged to receive material from a hopper or silo 35 through a conduit 36 having a valve 36a and through an inlet 37 in the top wall 17. Should it not be convenient or desirable to supply the material through an opening in the top wall 17, it may be supplied through an opening in the upper portion of the end wall 18. The conveyor discharges the material to any suitable receiving means such as a bin, a solids pump, or to a standard fluidizing conveyor FC, as shown, which is in communication with the discharge outlet 18a in the downstream end wall 18'.

Air for operating the material, after passing through the material on the gas-permeable floors, travels through the conveyor along the top wall 17 to escape through the discharge outlet 18'a at the discharge end of the conveyor. The air travels over the tops of the deflecting sections 30b of the partition walls 30 and between the sections 30b and the top walls, passing through the aligned openings 19a and 26a. The air thus entering the casing of conveyor FC escapes through a vent 39 leading from an opening in the top wall of the casing. However, in conveyors of extensive length, or where extremely high volumes of air are required, the upper conduit 12 may be vented at one or more places intermediate the ends of the conveyor and, advantageously, though not always necessarily, in a manner preventing either a build-up of pressure in the conduit or a countercurrent flow of air and material, so that each deflector section has at least some minimum of air flow thereover in the direction of material motion.

In the operation of the conveyor, the pulverulent material to be conveyed is introduced into the upstream end of the conveyor from the hopper 35 through the conduit 36 and inlet 37 and falls upon the gas-permeable floor 14 where it is fluidized by air diffused into the material through the upstream major floor area 14a'. The fluidized material travels downwardly along the floor by gravity, forming a fluidized material bed above the major floor area 14a which bed is more highly aerated above the downstream major area 14a". A portion of the fluidized material bed passes through the passageway between the lower edge of partition section 30a of partition 30 and onto the minor area 14b of the floor. Ordinarily, the partition section 30a is so adjusted that its lower edge lies at about half the depth of the fluidized material bed on the floor upstream of the partition. With the greatest rate of flow of air being through the minor floor area 14b, the already-fluidized material above it is caused to be fluidized to a further increased degree and to undergo a consequent increase in volume. Since the highly-expanded material is confined to the upwardly extending passageway defined by the side walls 15, 16, the wall 19 of the conduit section and by the partition wall 30, and is further confined by the pressure or head of the relatively more dense material bed on the major floor area 14a, which is exerted through the passageway beneath the section 30a of the partition wall, the highly aerated and expanded material above the minor area of the floor is forced to flow upwardly within the confined upright passageway.

The greater permeability, or lesser resistance to air flow, of the downstream major area 14a" offsets the greater head effect, and consequent greater resistance to air flow, of the deeper material bed above the downstream area 14a". This makes possible the use of a single source of air under pressure for at least the full extent of the major floor areas 14a, without short-circuiting of the air to and through the shallower portion of the beds. More important, however, the increased permeability of the downstream major area 14a" facilitates the maintenance of a more highly aerated, highly fluent material bed over the portion of the major deck area adjacent the minor deck area 14b. The high fluidity of the material in this zone both facilitates the feeding of the material through the passageway to the zone above the minor deck area, and preconditions the material by further expansion prior to its ultimate expansion above the minor deck area. This feature is also advantageous in those cases in which the slope of the floor is very slight, or non-existent, in which cases no significant problem of differing material depth is encountered.

As the material rises in the confined passageway, it is deflected by the section 30b of the partition wall and has its velocity boosted by the decreasing cross section between the confining walls and is caused to pass through the aligned openings 19a and 26a and onto the next succeeding course of the gas-permeable floor. The material then travels by gravity along that course and forms a similar fluidized material bed over the major area 14a of that floor course, and a progressively increasing aeration of the material again takes place over the downstream area 14a" and the minor area 14b of that course so that the material is raised between the interior wall and partition wall to pass over the overflow edge 19b, through the downstream opening 19a and onto the upstream end of the next floor course. The deflecting sections of the partitions 30 serve to direct the rising material through the downstream openings adjacent thereto and to prevent splashing of the material in a backward direction. Such splashing is further resisted by the air flowing between the upper walls and the deflecting sections of the partitions in the same direction as the flow of material.

When the conveyor is in operation as described, it contains a plurality of beds of fluidized material supported on the several courses of the gas-permeable floor at depths at least sufficient to close the passageways or openings below the partition walls while delivering material therethrough. From time to time, it may be desired to clean out the conveyor, as, for example, when a different kind of material is to be conveyed, and, for this purpose, the supply of material is cut off at valve 36a, while the supply of air to the plenum chambers of the several units is continued. As the discharge of material from the conveyor units depletes the thickness of the beds of material, thereby reducing the head effect exerted by the beds, the vertical sections of the partition walls are lowered to reduce the areas of the apertures beneath them. The pressure at each opening beneath a partition wall, which assists in confining the material being elevated between the partition and upright interior walls, is then supplied in part by the material and in part, if necessary, by jets of air issuing from jet pipes 40 and 40a mounted in converging relation in openings in the side walls of the conduit section of each unit adjacent the plane of the vertical section 30a of the partition wall of the unit.

Alternatively, the upper or deflecting section 30b may be arranged to be adjustable up to and against the top wall 17 to close the space therebetween. In this case, the escaping fluidizing air, which normally vents through the space between the partition and the top wall, will be obstructed from flow therethrough and forced to pass downwardly under the partition and upwardly between the partition and the end wall in order to escape to the vent 39. The turbulence and sweeping action caused by the air passing under the baffle is then effective to entrain through the upwardly extending passageway and the downstream opening 19a any residual material from the minor floor area and from the lower region of the major floor area. When the lower section 30a of the partition is then lowered to decrease the size of the passageway thereunder, the resultant increase in velocity of the trapped air therethrough increases the sweeping and entraining effect.

After as much material as possible has been discharged from each unit in the manner described, any remaining residual material or any trapped foreign objects too heavy to be lifted by the air flow can be removed manually through the cleanout opening in the downstream end wall of the unit after opening the cleanout door 19c.

The deflecting section of the partition walls partially regulates the flow of material through the downstream openings and wholly regulates the velocity at which air escapes from the unit over the top of the deflecting section. As the section is raised for maximum flow of material between the lower edge of the opening 19 and the upper edge of the deflector section 30b, the space between the section 30b and the top wall, through which the air escapes, is correspondingly reduced in area. As a result, the air passes through such space with increased velocity and is of increased effectiveness in preventing backward splashing of the increased flow of material.

The modified form of the conveyor shown in FIG. 4 is employed in situations in which it is desirable to elevate as well as convey the material. This conveyor comprises a casing 41 having an upper or conveying conduit section 42 and a plenum chamber 43 separated from the conveying conduit by straight courses of a gas-permeable floor 44. The plenum chambers contain individual walls 45, which divide respective courses of the plenum chamber into a major subchamber 43a and a minor subchamber 43b. Each of the walls 45 is provided with an orifice 46 providing communication between the subchambers 43a and 43b. The subdivision of the plenum chambers into major areas 43a and minor areas 43b effects a similar division of the gas-permeable floors into major areas 44a and minor areas 44b, respectively. The subchamber 43b receives air under pressure through an air inlet 43'.

A partition wall 47 is mounted in the conduit section 42 adjacent an upright interior wall 48 at the downstream end of each floor course and the partition has a straight section 47a mounted in guides 49 in a position slightly sloped from the vertical toward the wall 48, and an upper, less steeply inclined section 47b, which slopes more directly toward the wall 48, further decreasing the area therebetween. The section 47b acts as a deflector for directing material through a downstream opening 48a in the interior wall 48. The upwardly decreasing channel or passageway formed between the wall 48 and the sloping partition wall produces a gradual increase in velocity of the air rising through the passageway from the minor area 44b of the floor, and facilitates continued entrainment of the material upwardly in the passageway and through the downstream opening 48a, without substantial separation of the material from the air while within the passageway. The partition wall 47 is vertically adjustable in guides 49 by an adjusting screw 50.

The courses of the gas-permeable floor are inclined downwardly at a low slope in the direction of travel of the material, but the distance through which the material is elevated at the downstream end of each course of the floor 44 is such that there is a stepwise elevation of the material as it passes through the conveyor. The partitions 47 simultaneously regulate both the rate of material flow through the downstream openings and discharge outlet of the unit and the velocity of air flow through the space between the top of the deflector sections of the partitions and the top wall of the unit so that the rate of flow of the material through the downstream opening and the discharge outlet and the velocity of the air flowing through the space between the top of the deflector sections and the top wall of the conduit section vary generally directly with respect to each other, providing an increased air flow to prevent return splashing of the increased material flow.

Both the partitions 30 and 47 may be closed against the respective top walls for cleanout as discussed more fully hereinafter with reference to FIG. 7.

The operation of the FIG. 4 form of conveyor is substantially the same as the operation of the conveyor of FIGS. 1 to 3 except that there is substantially uniform fluidization of the material over the entire major deck area 44a and the material is given a stepwise elevation during its passage through the conveyor. As contrasted to the progressively increasing, three stage aeration, as disclosed with reference to FIG. 1, the degree of aeration of the fluidized bed above the major deck area 44a, in the operation of the embodiment shown in FIG. 4, is substantially uniform and is not significantly affected by a difference in material head due to the very low slope of the floor area. The orifice 46 is of such size that air is supplied therethrough to the subchamber 43a for the proper rate for the fluidization of the material bed thereabove.

In FIG. 5, there is shown an installation of the new conveyor 51 which is adapted to supply material in controlled quantities to a plurality of kilns 52, 53, 54 and 55. The conveyor is formed of a plurality of courses and comprises a casing 56 having a conveying conduit section 57, a plenum chamber 58, and a gas-permeable floor 59 separating the conduit section and plenum chamber. The conduit section 57 is provided with a plurality of interior walls 60 and vertically adjustable partitions and deflector walls 61. Interior walls 60 each have a downstream opening 60a therein. The conveyor 51 is generally similar in construction to the conveyor of FIG. 1, except that it has no partition wall or material outlet opening at its downstream end and is provided with an air vent 62 in its top wall near its downstream end. However, where desired, a partition wall and a closable outlet opening may be provided therein when a positive cleanout of the conveyor is required to permit a change of material, or for any reason. Interrupting each major course of the floor 59 is an open-top casing 63 mounted transversely of the conveyor between two sections of the plenum chamber. A shaft 64 with screw flights 64a extends through the casing 63 and is driven preferably through a variable-speed drive by a motor 65. Part of the material moving through the conveyor enters the casings and is discharged by the conveyor screws into individual pipes 66 leading into the upper end of the respective kilns 52, 53, 54 and 55. Material is supplied to the conveyor 51 from a bin 67 through a material conduit and valve 68 and, in order to prevent too great a volume of material from being supplied to the conveyor, or to obtain a constant material level and a consequently accurate metering by the screws 64a, or for both purposes, a material level control device, generally indicated at 69, may be provided near the downstream end of the conveyor. This device may be of the type disclosed in Lenhart Patent No. 2,116,075, issued May 3, 1938, and may be arranged to operate control valve 68 to cause flow of material at the desired rate into the conveyor. However, a relatively constant rate of flow through the valve 68 may be adequate in itself, since the material beds in the conveyor will tend to seek individual, relatively stable levels, producing individually constant material heads above the respective screws and providing individually constant sources of material, from which the screws may make sufficiently accurate volumetric deliveries.

Furthermore, single or multiple gravity discharges to a plurality of points, such as a row of cement silos, may be effected by discharge outlets located at any point in the conduit section 57 which is below the upper level of the material bed, and may be on either side of the partitions 61, though preferably upstream thereof. For this purpose, a discharge conduit may be connected to the ports otherwise available for cleanout at the downstream end walls, as at 19c of FIG. 1, or may be connected to similar ports or apertures in either side wall and on either side of the partitions 61, and also may be provided with suitable valving and controls for selective or common delivery therethrough.

In FIG. 7, elements similar to those shown in FIG. 1 are identified by the same numerals, primed. In this figure, the conveyor is shown in a partially dismantled state to clarify the construction thereof. Also shown is a modified form of partition 30' which is permanently affixed in a position advantageous to normal conveying. Above the partition 30', a flap 71, which is of sufficient width to form a seal between the side walls 15' and 16', is secured to the top wall 17' by a hinge 72. The hinge permits oscillation of the flap between an open position, in which it lies against the top wall 17' and permits maximum venting of air to the downstream opening 19a', and a closed position, in which it engages the surface of the partition 30', and prevents the passage of air through the space between the partition 30' and the top wall of the casing. The flap 71 is provided with a shaft 73 which extends through the hinge 72 and protrudes through the side wall 16' and in sealing relationship therewith to prevent the escape of air and dust. The external portion of the shaft 73 is provided with a weighted lever 74. The lever 74 is arranged so that its weight holds the flap 71 in its open position at all times during which it is unattended.

In operation, the retention of the flap 71 in its open position by the lever 74 permits the venting of air through the downstream opening 19a' and the normal operation of the conveyor as described with reference to FIG. 1. However, when it is desired to completely empty the conveyor, the greater part of the material is removed by continued operation thereof without the addition of further material. When the conveyor has substantially depleted its material content, the lever 74 is thrown to rotate the flap 71 to its closed position. When the passage of air between the top wall 17' and the partition 30' is thus obstructed, the total air flow passing upward through each major floor area 14a' is forced to pass underneath the partition 30' and upwardly through the passage between the interior wall 19' and the partition 30'. This results in an increase in air velocity through the passageways which sweeps on and entrains any residual material on the floor area 14b', providing a positive removal thereof through the downstream opening 19a over the overflow edge 19'b. The effect of this air flow is cumulative as it progresses downstream through the conveyor, and effects a thorough cleanout.

The advantages of optionally confining the total air flow to the opening between the partition and the gas-permeable floor may be obtained by various arrangements of apparatus other than that of the flap 71. The upper or deflector section 30b, of FIG. 1, may be arranged to close against the top wall 17, to eliminate the opening therebetween while retaining contact with the lower section 30a, without increasing the spacing between section 30a and the gas-permeable floor 14. The partition 47, of FIG. 4, may be used similarly, but with less advantageous results since elevation thereof to close against the top wall will increase the opening between the partition and the gas-permeable floor, thereby reducing the sweeping velocity of the confined air passing therethrough. Furthermore, when the opening between the lower edge of the partition and the gas-permeable floor is adjustable, and means are provided for closure of the opening between the partition and the top wall, the opening adjacent the gas-permeable floor may be reduced to cause a further increase in velocity of the air sweeping therethrough.

Where means, such as the flap 71, are provided to confine the air flow to the opening adjacent the gas-permeable floor, or where complete cleanout is not necessary, the jet pipes 40 and 40a generally are not required. Also, if desired, the operation of the several means for positioning of the partitions, and for the closure of the openings adjacent the top wall, may be effected through remote control mechanisms.

In addition to its application for the conveyance of material in locations with limited headroom and in other services preventing the use of an ordinary fluidizing conveyor, the new conveyor may be employed to especial advantage even when headroom is not limited for receiving supplies of material from one or more sources at irregular intervals and delivering the material to a desired point at a substantially uniform rate. A typical instance of such use of the new conveyor involves its receiving material from a plurality of dust collecting vessels and delivering the material to a belt conveyor or a pump of the Fuller-Kinyon type, such as that disclosed in Morrow Patent 1,941,573, issued January 2, 1934. Dust collectors commonly discharge collected dust at irregular intervals as the head of the collected material overcomes a discharge seal gate loaded by a weight or spring. When the required quantity of material accumulates, a sudden discharge takes place with the result that the pump or belt is overloaded. Such overloads impose undesirable strains on mechanical equipment and cause stoppages because of the opening of protective circuits for the associated electrical motors, and the situation is aggravated when two or more collectors discharge simultaneously or at such short intervals as to cause a cumulative overload. The new conveyor avoids problems arising from surges in the supply of material described above in that such a surge acts only to raise the level of the material to the rear of a partition wall, so that the instantaneous rate of delivery of the material to the pump is not radically increased. The surges are thus substantially absorbed in the individual material bed or successive beds of the conveyor, so that discharge from the conveyor to the belt or pump is at a relatively steady rate of flow.

Another desirable feature of the new conveyor is that it can be started and stopped at will and can thus be used in situations where screw conveyors cannot be employed advantageously, because they cannot be started under full load.

The possibility of employing the new conveyor to deliver material at an elevation higher than the inlet end of the conveyor is advantageous in numerous installations, as, for example, it permits the delivery of material to the hopper of a pump mounted at ground elevation and thus avoids the necessity of digging a pit for the pump to lower the level of the hopper to the levels often required by prior fluidizing conveyors. Also, the conveyor can convey material in an upward direction and thus clear other equipment or obstacles. The conveyor is wholly flexible in respect to direction of travel of the material and adjacent segments can be in line, as shown, or placed at any desired angle to each other, or may combine both horizontal and inclined courses, as desired.

Although the invention has been described in its preferred form in which the material over the major floor areas is fluidized to different degrees, and the material over the minor areas is aerated to a still greater degree to cause it to expand through the upwardly extending passageway, it is to be understood that, if desired, the conveyor may be so constructed as to provide an equal rate of gas flow throughout the major floor area, as in FIG. 4.

While the use of a different rate of gas flow per unit area through the major and minor floor areas is preferred, in some installations a uniform rate of gas flow per unit area through both the major and minor floor areas may be used, if the rate of gas flow is sufficient to expand the material upwardly through the passageway above the minor floor area. However, if the material above the major floor area is thus extremely fluidized to the same degree as the material in the upwardly extending passageways, the resultant undirected dusting of fine material into the air space above the material bed will create a distinct dust problem requiring direct separation of the dust from the air if it is necessary to discharge clean air to the atmosphere. In some cases where the cost of dust collecting equipment can be overcome by using existing collecting equipment, as in a grinding and separating circuit, or by other expedients, this form of invention can be used in this simpler form embodying uniform rates of gas flow per unit area throughout the major and minor floor areas.

Various changes may be made in the details of construction of the several forms of conveyors disclosed without departing from the scope of the invention or sacrificing any of the advantages thereof.

I claim:

1. Apparatus for conveying a finely divided material in substantially dry condition including a casing having means for admitting a material thereinto and a material outlet and comprising an upper conduit section and a plenum chamber therebeneath, a gas-permeable floor between the upper conduit section and the plenum chamber along which material is adapted to be conveyed, the floor comprising a plurality of floor courses, the upstream end of each downstream floor course being at a higher elevation than the downstream end of the preceding floor course, an upwardly extending interior wall in the upper conduit section at the downstream end of each floor course, a partition adjacent and spaced upstream from each interior wall and forming at least in part an upwardly extending passageway, each of the partitions having a passage therein adjacent the underlying gas-permeable floor course, means for passing a gas upwardly through each floor course to fluidize material thereon and to cause it to flow along the floor course and beneath the partition above the floor course, each floor course including a minor area beneath the passageway and a major area upstream therefrom, means for causing a greater rate of gas flow per unit area through the minor area of each floor course, than the concurrent gas flow through the major area of the floor course, whereby the fluidized material flowing beneath the partitions onto the minor areas is expanded and caused to flow upwardly through the passageways, each passageway having a portion terminating short of the top of the casing and forming an overflow edge for material passing upwardly through the passageway, the next following downstream floor course having its upstream end positioned to receive material flowing over the overflow edge, and the overflow edge adjacent the downstream end of the last downstream floor course at least partly defining the material outlet.

2. The conveying apparatus of claim 1 which includes means for causing a flow of gas through the downstream portion of the major area of the floor at a rate per unit area intermediate the flow through the minor area and the upstream portion of said major area.

3. The conveying apparatus of claim 2 in which the permeability of the downstream portion of the major area of the floor is greater than the permeability of the upstream portion thereof, and the permeability of the minor area of the floor is greater than the permeability of the downstream portion of the major area of the floor.

4. The conveying apparatus of claim 1 in which the minor floor area of a downstream floor course and the adjacent overflow edge are at higher levels, respectively, than the minor floor area and the adjacent overflow edge of the adjacent upstream floor course.

5. The conveying apparatus of claim 1 in which the conduit section has a top wall connecting the side walls and the upper section of each partition cooperates with the side and top walls to define a space therebetween for passage of the fluidizing gas along the top wall after release from the material being conveyed, and means are provided adjacent the downstream end of the conduit section for venting fluidizing gas passing along the top wall.

6. The conveying apparatus of claim 1 in which means are provided for withdrawing from the conduit section at least a portion of the material moving along a plurality of the major floor areas.

7. In a fluidizing conveyor comprising a conduit section, a gas-permeable floor along which material is adapted to move, a plenum chamber underlying the floor, the conduit section having a discharge end, an end wall and a pair of side walls at the discharge end of the conduit section, an upwardly extending partition in said conduit section, said partition being spaced from the end wall and with at least said end wall and one side wall defining an upwardly extending passageway, the lower edge of the partition being spaced from the floor to permit flow of material along the floor beneath the partition, at least a portion of a wall forming the passageway terminating below the top of the conduit section and forming an overflow edge, and means for passing a gas upwardly through the floor to fluidize material thereon, the floor including a minor area beneath the passageway and a major area upstream therefrom, the permeability of the minor floor area being greater than the permeability of the major floor area to provide for a greater rate of flow of gas through the minor floor area, whereby the fluidized material flowing beneath the partition and into the passageway will be expanded and caused to flow upwardly in the passageway and over the overflow edge.

8. The apparatus of claim 7 including means for causing a greater rate of gas flow per unit area through the downstream portion of the major area of the floor than through the upstream portion of said major area.

9. The apparatus of claim 8 in which the means for causing a greater rate of gas flow through the downstream portion of the major area of the floor includes a gas-permeable floor of greater permeability adjacent the minor area than the permeability of the remaining major area of the floor.

10. In a fluidizing conveyor comprising a conduit section, a gas-permeable floor along which material is adapted to move, a plenum chamber underlying the floor, the conduit section having a discharge end, an end wall and a pair of side walls at the discharge end of the conduit section, an upwardly extending partition in said conduit section, said partition being spaced from the end wall and with at least said end wall and one side wall defining an upwardly extending passageway, the cross-sectional area of the passageway decreasing upwardly, the lower edge of the partition being spaced from the floor to permit flow of material along the floor beneath the partition, at least a portion of a wall forming the passageway terminating below the top of the conduit section and forming an overflow edge, means for passing a gas upwardly through the floor to fluidize material thereon, the floor including a minor area beneath the passageway and a major area upstream therefrom, and means for causing a greater rate of gas flow per unit area to pass through the minor area of the floor underlying the passageway than the concurrent gas flow through the major area of the floor, whereby the fluidized material flowing beneath the partition and into the passageway will be expanded and caused to flow upwardly in the passageway and over the overflow edge.

11. The conveying apparatus of claim 10 in which the casing has a top wall, and the partition is adjustable in relation to the underlying floor and the top wall of the casing to vary the flow of material and gas through the spaces between the bottom of the partition and the floor and the top of the partition and the top wall of the casing, respectively.

12. In a fluidizing conveyor comprising a conduit section, a gas-permeable floor along which material is adapted to move, a plenum chamber underlying the floor, the conduit section having a discharge end, an end wall and a pair of side walls at the discharge end of the conduit section, an upwardly extending partition in said conduit section, said partition converging towards the end wall, being spaced from the end wall and with at least said end wall and one side wall defining an upwardly extending passageway, the upper portion of the partition extending across the top of the passageway to deflect towards the overflow edge material rising through the passageway, the lower edge of the partition being spaced from the floor to permit flow of material along the floor beneath the partition, at least a portion of the end wall forming the passageway terminating below the top of the conduit section and forming an overflow edge, means for passing a gas upwardly through the floor to fluidize material thereon, the floor including a minor area beneath the passageway and a major area upstream therefrom, and means for causing a greater rate of gas flow per unit area to pass through the minor area of the floor underlying the passageway than the concurrent gas flow through the major area of the floor, whereby the fluidized material flowing beneath the partition and into the passageway will be expanded and caused to flow upwardly in the passageway and over the overflow edge.

13. In a fluidizing conveyor comprising a conduit section, a gas-permeable floor along which material is adapted to move, a plenum chamber underlying the floor, the conduit section having a discharge end, an end wall, a top wall and a pair of side walls at the discharge end of the conduit section, an upwardly extending partition in said conduit section, said partition being spaced from the end wall and with at least said end wall and one side wall defining an upwardly extending passageway, the lower edge of the partition being spaced from the floor to permit flow of material along the floor beneath the partition, the upper portion of the partition being spaced from the top wall, means for obstructing the flow of gas through the space between the upper portion of the partition and the top and side walls of the casing, at least a portion of a wall forming the passageway terminating below the top of the conduit section and forming an overflow edge, means for passing a gas upwardly through the floor to fluidize material thereon, the floor including a minor area beneath the passageway and a major area upstream therefrom, and means for causing a greater rate of gas flow per unit area to pass through the minor area of the floor underlying the passageway than the concurrent gas flow through the major area of the floor, whereby the fluidized material flowing beneath the partition and into the passageway will be expanded and caused to flow upwardly in the passageway and over the overflow edge.

14. The conveying apparatus of claim 13 in which the partition includes a deflecting upper section, and means are provided for raising the deflecting section against the top wall to obstruct the flow of gas through the space therebetween.

15. The conveying apparatus of claim 13 in which said obstructing means comprises a flap valve.

16. In a fluidizing conveyor comprising a conduit section, a gas-permeable floor along which material is adapted to move, a plenum chamber underlying the floor, the conduit section having a discharge end, an end wall and a pair of side walls at the discharge end of the conduit section, an upwardly extending partition in said conduit section, said partition being spaced from the end wall and with at least said end wall and one side wall defining an upwardly extending passageway, the lower edge of the partition being spaced from the floor to permit flow of material along the floor beneath the partition, at least a portion of a wall forming the passageway terminating below the top of the conduit section and forming an overflow edge, means for passing a gas upwardly through the floor to fluidize material thereon, the floor including a minor area beneath the passageway and a major area upstream therefrom, means for causing a greater rate of gas flow per unit area to pass through the minor area of the floor underlying the passageway than the concurrent gas flow through the major area of the floor, whereby the fluidized material flowing beneath the partition and into the passageway will be expanded and caused to flow upwardly in the passageway and over the overflow edge, the means for causing a greater rate of gas flow through the minor floor area comprises a partition subdividing the plenum chamber near the juncture of the major and minor floor areas and having a limiting orifice therein for passage of gas therethrough into the portion of the plenum chamber beneath the major floor area and means for admitting a gas to the subdivision of the plenum chamber underlying the minor floor area.

17. In a fluidizing conveyor comprising a conduit section, a gas-permeable floor within the section, along which material is adapted to move, a plenum chamber underlying the gas-permeable floor, the conduit section having a discharge end, an end wall, a top wall and a pair of side walls at the discharge end of the conduit section, an upwardly extending partition in the conduit section in spaced relation to the end wall and back from the end of the floor, the partition with the end wall and side walls defining an upwardly extending passageway, the lower edge of the partition being spaced from the floor to provide an opening for flow of material along the floor beneath the partition, the upper portion of the partition being spaced from the top wall, means for obstructing the flow of gas through the space between the upper portion of the partition and the top and side walls of the conduit section, at least a portion of a wall forming the passageway terminating below the top of the conduit section and forming an overflow edge, and means for passing a gas upwardly through the floor to fluidize material thereon, whereby the fluidized material flowing beneath the partition and into the passageway will be expanded and caused to flow upwardly in the passageway and over the overflow edge.

18. The conveying apparatus of claim 17 in which the partition includes a deflecting upper section, and means are provided for raising the deflecting section against the top wall of the conduit section to obstruct the flow of gas through the space therebetween.

19. The conveying apparatus of claim 17 in which said obstructing means comprises a flap valve.

References Cited in the file of this patent

UNITED STATES PATENTS

| 2,316,814 | Schemm | Apr. 20, 1943 |
| 2,538,235 | Coffey | Jan. 16, 1951 |
| 2,697,653 | Nicholson | Dec. 21, 1954 |
| 2,735,725 | Galle | Feb. 21, 1956 |
| 2,740,671 | Sayre | Apr. 3, 1956 |
| 2,769,544 | Morrow | Nov. 6, 1956 |

FOREIGN PATENTS

| 1,016,397 | Germany | Sept. 26, 1957 |